(12) United States Patent
Spiegel et al.

(10) Patent No.: US 10,102,163 B2
(45) Date of Patent: Oct. 16, 2018

(54) BUS PARTICIPANT DEVICE AND METHOD FOR OPERATING A BUS SUBSCRIBER DEVICE

(71) Applicant: KOENIG-PA GMBH, Lauf an der Pegnitz (DE)

(72) Inventors: Gerhard Spiegel, Nürnberg (DE); Viktor Vysotski, Schwarzenbruck (DE)

(73) Assignee: KOENIG-PA GMBH, Lauf an der Pegnitz (DE)

(*) Notice: Subject to any disclaimer, the term of this patent is extended or adjusted under 35 U.S.C. 154(b) by 0 days.

(21) Appl. No.: 15/038,523

(22) PCT Filed: Nov. 24, 2014

(86) PCT No.: PCT/EP2014/075441
§ 371 (c)(1),
(2) Date: Sep. 30, 2016

(87) PCT Pub. No.: WO2015/075249
PCT Pub. Date: May 28, 2015

(65) Prior Publication Data
US 2016/0292106 A1 Oct. 6, 2016

(30) Foreign Application Priority Data
Nov. 23, 2013 (DE) .................. 10 2013 223 971

(51) Int. Cl.
*G06F 13/38* (2006.01)
*G06F 13/362* (2006.01)
(Continued)

(52) U.S. Cl.
CPC ........ *G06F 13/362* (2013.01); *G06F 13/4022* (2013.01); *G06F 13/4295* (2013.01);
(Continued)

(58) Field of Classification Search
CPC .............................................. H04L 12/40202
See application file for complete search history.

(56) References Cited

U.S. PATENT DOCUMENTS

| 5,751,220 A | 5/1998 | Ghaffari |
| 7,197,660 B1 * | 3/2007 | Liu ................ G06F 11/2035 714/4.12 |

(Continued)

FOREIGN PATENT DOCUMENTS

| JP | H 11-559394 | 8/1999 |
| JP | 2002-77423 | 3/2002 |

(Continued)

OTHER PUBLICATIONS

International preliminary report on patentability received in connection with international application No. PCT/EP2014/075441; dated Mar. 24, 2016.

(Continued)

*Primary Examiner* — Ilwoo Park
(74) *Attorney, Agent, or Firm* — The Marbury Law Group, PLLC

(57) ABSTRACT

The invention relates to a bus participant device (30) for receiving and transmitting data telegrams (18) via a serial data bus (12) according to a master/slave method, wherein the bus participant device (30) is configured to function, in a slave mode, as a slave (16) on the data bus (12) by means of a slave unit (36) that is part of the bus participant device (30), wherein the bus participant device (30) comprises a master unit (38) that can be activated. In particular, by means of the slave unit (36) and/or the master unit (38), a transmission of data telegrams (18) via the data bus (12) can be monitored for a malfunction of an active bus master (14). Preferably, subject to a result of the monitoring process, an activation of the master unit (38) by means of the slave unit (36) or the master unit (38) can be effected. The invention further relates to a method for operating a serial data bus (12), and to various safety-critical devices.

18 Claims, 8 Drawing Sheets

Figure 1:
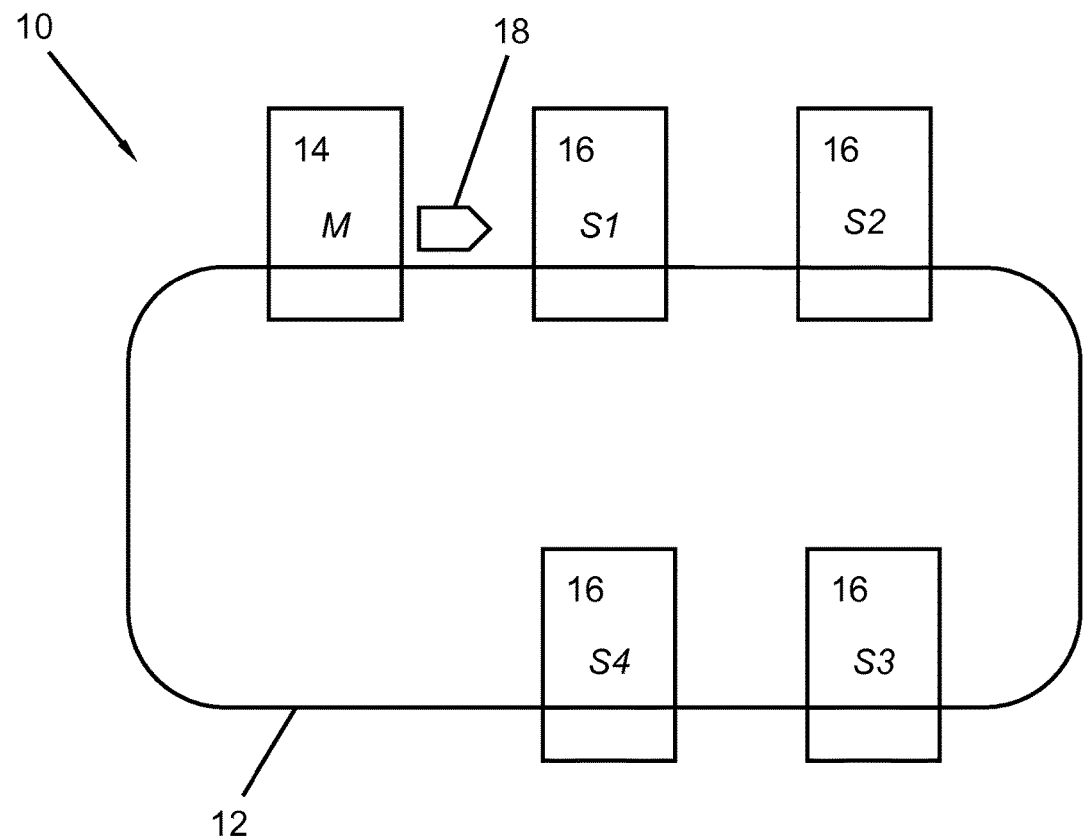

(51) Int. Cl.
*H04L 12/40* (2006.01)
*H04L 12/437* (2006.01)
*G06F 13/40* (2006.01)
*G06F 13/42* (2006.01)

(52) U.S. Cl.
CPC .. *H04L 12/40019* (2013.01); *H04L 12/40202* (2013.01); *H04L 12/437* (2013.01); *H04L 2012/4026* (2013.01)

(56) References Cited

U.S. PATENT DOCUMENTS

| | | | | |
|---|---|---|---|---|
| 2008/0288607 | A1* | 11/2008 | Muchow | G06F 9/44505 709/209 |
| 2009/0235001 | A1* | 9/2009 | Buttner | H04L 12/437 710/110 |
| 2011/0029687 | A1 | 2/2011 | Kirrmann et al. | |
| 2013/0325146 | A1* | 12/2013 | Stiller | G05B 11/01 700/20 |
| 2013/0344802 | A1* | 12/2013 | Armour | H04W 84/005 455/39 |
| 2014/0077597 | A1* | 3/2014 | Nishibayashi | H02J 4/00 307/31 |

FOREIGN PATENT DOCUMENTS

| | | |
|---|---|---|
| JP | 2007-281800 | 10/2007 |
| JP | 2010-510741 | 4/2010 |

OTHER PUBLICATIONS

English translation of the international preliminary report on patentability received in connection with international application No. PCT/EP2014/075441; dated Mar. 24, 2016.

* cited by examiner

BUS PARTICIPANT DEVICE AND METHOD FOR OPERATING A BUS SUBSCRIBER DEVICE

The invention relates to a bus participant device and to a method for the operation of a bus participant device. The bus participant device is intended for connection to a serial data bus with access control to the medium according to a master slave method. Further possible features are the active distribution according to the hop-to-hop method and the joint use of the data in a data telegram according to the summation frame method. Bus participant devices with these features are known in principle. Examples for a bus participant device of the type named at the start are devices that act as master or slave at the data bus. The data bus and the entirety of the connected devices, i.e. one master and at least one slave, normally a plurality of slaves, are referred to in the following as a network or as a net in short.

Only the master sends data telegrams in the network via the data bus that are also referred to in the standard specialist terminology as frames.

A frame can include all data or only the individual data of a slave. For example, in the hop-to-hop method a data telegram that is transferred to a data bus is received by one slave or by a series of slaves or preferably by each of the slaves connected to the bus. During this process a slave can take the data package segments (input data) that is assigned to it in the data telegram from the data flow passing it and insert the output data into the data telegram as data package segments. Each slave forwards the thus modified data telegram to the corresponding subsequent slave. Normally, all slaves behave in the same way. The last slave in a bus architecture that is in the form of a string and not closed into a ring recognizes itself as the last slave because no further slave is connected to its send interface, known as an open port. The last slave in the data bus then sends the data telegram back to the prior slave via its receiving interface.

All upstream slaves behave in the same way. The data telegram 18 is returned to the master in this way. Thus the last slave closes a logical ring. Physically, all slaves or slave groups are connected in series and are passive, i.e. they can only transfer data to the data bus themselves within the scope of a data telegram that is transferred onto the data bus by the master. Functional differences exist in this kind of summation frame method between a communications participant that is acting as master and a communications participant that is acting as slave. A communications participant that is acting as a slave is characterized here by a comparatively simple design. If the master fails, then no communication will take place within the network because the initiator is missing. The entire network is effectively idle.

Circular structures are mostly avoided according to the current state of technology, particularly in Ethernet communication, because of cost reasons. If redundant communication is required despite this then it is possible to separate the circular structures by deactivating the individual connections in a chain of hop-to-hop bus participants. However, the methods that are used for this, particularly in order to reverse the transmission direction, are slow and therefore not suitable for fast, real-time communication. An overview of the variants can be found in the IEC norm 62439. A so-called hitchless protocol is also defined in 62439-3 with regard to the failure of communication lines. This means that there is no interruption to communication or loss of data if possible, which can be achieved through the fastest possible transition when switching over. However, the definition is not valid with regard to the application function in the two following forms:

PRP (Parallel Redundancy Protocol) describes a method in which the networks and their connections are simply duplicated. However, this is very complex.

HSR (High availability Seamless Ring) describes a method in which the redundant data is processed on the two paths through the ring. However, this means additional effort in the realization of all slaves.

A known solution by the company Beckhoff Automation GmbH involves the redundancy of two masters, with communication between masters taking place via three switches, four additional lines and by means of an additional proprietary or based on the standardized protocol, e.g. the EtherCATAutomation protocol (EAP). The solution was published in the Beckhoff Application Note K9321-0809-0004. This solution is very complex. The solution is also unsuitable for security-relevant or synchronous application.

Specifically in master-slave networks with safety functions, in which it can be difficult to place the slaves or an entire system in which the network works into a safe state if the master fails. For example, a replacement master that quickly takes over the function of a failed master is very important on a vehicle.

The problem of this invention is the provision of a simple and efficient option for a master-slave network to switch over the bus master.

This problem is solved according to the invention with a bus participant device with the features of claim 1. The bus participant device comprises known means for connecting to a serial data bus and for receiving a data telegram transmitted via the data bus according to a hop-to-hop method. Furthermore, the bus participant device is configured to function as a slave on the data bus in slave operation using one of the slave units comprised by the bus participant device. The bus participant device comprises a connectible master unit.

This achieves master redundancy without additional connections in comparison to a system with slaves without an additional master redundancy function. The redundancy is therefore provided in addition, with very little effort, and can also be easily retrofitted in existing systems, e.g. by replacing an existing slave with a bus participant device according to the invention. An existing system can also be upgraded by the additional connection of a bus participant device according to the invention with master redundancy. A bus system that is fitted with master redundancy according to the invention can thus offer high fail operability which means a high probability of continued operation following a failure. The bus participant device can be configured as a mechanically separate unit.

It is preferable that the transmission of data telegrams is monitored via the data bus using the slave unit. The master unit that is comprised by the bus participant device can also be activated depending on the result of the monitoring using the slave unit or the master unit of the bus participant device. In one version it is conceivable that the master unit activates itself when it recognizes failures in a previously active master and deactivates this specifically. In all cases the previously active master can be a bus participant device according to the invention, able to be deactivated by an external bus participant.

A reason for one advantage of the activation of a master by a slave is the greater complexity of a master, giving it a higher probability of failure. In particular the master is essentially controlled by software and the slave essentially by hardware, so that the safety of the overall system is increased by the use of the safe slave for the activation as opposed to self-activation by the master. The master and slave units are arranged together in the bus participant device. The activation can be therefore carried out internally in the bus participant device. The activation of the master unit as bus master is then independent of the bus operation problems, which is particularly relevant when switching over following modification of the bus architecture, e.g. because of cable breakage or failure of a transmitting unit or failure of the prior master. This also substantially increases the security of the bus operation against failure. The safety of the system can be increased even further through exclusive monitoring by the slave unit.

It is also possible to activate or de-activate the additional master by having it activated or de-activated via messages from outside to the slave unit of the bus participant device. Internal communication is in place in the bus participant device for this purpose between the master unit and the slave unit, for example via a joint memory area. The master unit can be responsive to external bus participants as a sub-unit of the slave unit.

The bus participant device that functions only as a slave in slave operation therefore becomes a kind of supervisor in the network according to the proposed approach without giving up its slave features. The bus participant device that functions as a slave thus carries out the other functions of a slave. In particular the slave in the bus participant device monitors reception of a data telegram placed on the data bus by a bus master outside the bus participant device. Furthermore this slave can remove data package segments from the data flow of the data telegram pursuant to a particular configuration. Pursuant to a particular configuration this slave can insert data package segments into the data flow in the data telegram. For example the failure of the device functioning as master in the network can be recognized because of the monitoring of the sending of data telegrams via the data bus by the slave unit in the bus participant device. Activation of the master unit comprised by the bus participant device is possible automatically using the slave unit if this kind of situation is recognized. When this kind of situation is recognized during operation of the bus participant device, the activation can be undertaken automatically by the master unit comprised by the bus participant device. Because the bus participant device comprises a slave unit and a master unit that is passive in slave operation but can be activated by the slave unit and thus can function either as slave or master at the data bus or in the network, the bus participant device that is proposed here is also referred to in the following as a hybrid. A passive master is taken to mean a mode of operation of this master where this monitors data that is transmitted from the bus and evaluates data that it receives from the slave in the hybrid. It is preferable that the passive master monitors all of this data. However, the passive master does not send data. The passive master should preferably be connected to the data bus in order to monitor.

In order to activate or de-activate the master unit using the slave unit, the slave unit can receive a command in this regard from the previously passive master unit that is, for example, monitoring the data traffic, for example as the results of error monitoring in the previously active master. The slave unit can also recognize the activation case itself, for example on the basis of absent data telegrams or unexpected reception times.

Two or more bus participant devices, in particular of the same type, can be connected to the data bus and they can form single or multiple master redundancy. In the case of multiple redundancy it is preferable to install an instance that selects, in the event of switching over a master, which of the replacement masters is to be used. This prevents the collision of several masters on the bus.

The bus participant device should preferably have exactly two interfaces for communication with the bus. Preferably, it will not have any further interfaces other than one or several interfaces to the bus. The interfaces are preferably Ethernet interfaces. Alternatively, a third interface is possible for the parameterization of the bus participant device, in particular an Ethernet interface.

The bus participant device can function on the data bus either as a slave with a bus-off master or as a slave with a passive master or as a slave with an active master. A master that is set as a bus-off master must be seen as a master disconnected from the bus. The type of operation as a pure slave is executed preferably if the master unit in the bus participant device is defective.

The bus participant device represents a communication participant in the network that is able, with the master unit it comprises, to take over the function of the previous bus master if it fails. The monitoring of the data traffic at the bus that is necessary for this can be undertaken by the slave unit and/or the master unit in the bus participant device, the master unit reading data on the bus. The slave unit is thus a control instance at the data bus.

This function can be alternatively or additional taken over by the master unit. Corresponding supervisory results may be communicated to the slave unit by the master unit.

Please note that the method in this patent application can also be further developed corresponding to the dependent device requirements or vice versa.

In one embodiment of the bus participant device its slave unit comprises methods for the supervision of a time period between the input of a data telegram and the input of an immediately following data telegram and also methods to compare the relevant time period with a limit value that is given or can be given. If the limit value is exceeded, then the master unit can be activated using the slave unit. The supervision of the sending of data telegrams via the data bus is carried out like the role of a watchdog. By such kind of supervision, the failure of the bus master based on the absence of the data telegrams is recognizable, which are normally received on a regular basis, in particular equidistant time intervals.

In a further embodiment of the bus participant device this comprises a function changer that can be controlled by the slave unit. By the function changer, a connection to the data bus for reading from the data bus as a reaction to a switch signal from the slave unit in the course of the activation of the master unit is effectable. Specifically, the slave unit can also be used for activation of the master unit for writing to the data bus. By connection here we mean the creation of a data connection. The function changer should preferably be able to be controlled using the slave unit. It can effect different kinds of connection the data bus through to the slave unit and the master unit and thus the realization of different modes of operation of the bus participant device. The function changer determines at least some of the internal communication paths in the bus participant device.

The master unit can be connected to the data bus for reading even before its complete activation. The function changer then causes the full connection of the master unit on the data bus as a reaction to the switch signal of the slave unit, including the possibility of writing on the data bus. If the master unit has not already been connected to the data bus, then the function changer will connect the master unit to the data bus as a reaction to the switch signal from the slave unit.

In one embodiment of the bus participant device the function changer can be used alternatively either in a first switch mode to connect the slave unit to the data bus without a master; in a second switch mode the slave unit and the master unit, which is connected for reading only, can be connected to the data bus. In a further, third switch mode the slave unit and the active master unit can be connected to the data bus for reading and writing in series.

The second switch mode allows connecting the master unit for reading to the data bus. In this way the master unit can continuously listen to the data traffic at the data bus without taking over the function as bus master. This way, a passive master can keep available data that the active bus master also has, so that a master change can be carried out with fewer problems. Notably, the master sends data relating to its condition. This removes the necessity for a direct connection of the master via a different path than the standard data bus, which would be necessary if there were redundant masters in a network according to the latest state of technology.

Following a master change, the arrangement of the bus participants on the data bus changes in relation to the new master. As the travel times change from the new master to the other bus participants after the master change, the participants need to be re-synchronized to one another. The travel times between individual bus participants can be predetermined and stored. They can, alternatively or additionally, be determined during operation. This known data can be used to calculate the travel time delays between the new master and the other participants. The travel times between the individual bus participants can be added in such a way as to find a travel time between one participant and the new master. The calculation of these values can be used to complete a faster master change. Specifically, the new travel times to the master are calculated or parameterized already before the master change. Following this kind of re-synchronization, a travel time equalization can be carried out using known methods. Specifically, this takes into account a delay in synchronization of a few nanoseconds. The synchronization can be carried out in that a reference time is written on the data bus by a bus participant, particularly the active bus master, and the other bus participants adjust their time to the reception time plus the relevant travel time.

The slave unit can also be connected or made connectible to the data bus to receive and send in a forward direction and in a backward direction. This can be beneficial for operation of the bus participant device on a bus with a string architecture, with at least the relevant string where the bus participant device is located not being closed to form a ring. However, it can be useful to include this kind of participant device in a ring-shaped architecture because this can be disconnected through the failure of a participant in some cases. The operation can then be continued in the resulting string architecture. The slave can have a double set of sending and receiving ports for this purpose. The two interfaces on the bus participant device can each be connected or be connectible to a sending and receiving port each on the slave unit.

The slave can then send and receive on each of the interfaces on the bus participant device so that sending data from the bus participant device can take place in either a forward direction or a backward direction. In turn it is then possible to send data telegrams from the bus participant device in a non-ring-shaped bus architecture in both directions via the bus.

If only the slave unit is connected (which can also be meant by the term "switched" in this application) to the bus (first switch mode), then the function changer on the bus participant device should preferably be connected in such a way that data telegrams run via the slave. If they run forward, they can run from an interface that works as a receiving interface on the bus participant device to an internal receiving port on the slave unit, through the slave to the internal sending port on the slave unit and from there to an interface on the bus participant device working as a sending interface. If a data telegram is to run backward through the bus participant device in order to change the operating direction of the bus, then the function changer can interconnect the interface on the bus participant device that was previously working as a receiving interface with the sending port on the slave unit and the sending port on the bus participant device with the receiving port on the slave unit. Then a data telegram can be received from the interface on the bus participant device that serves as a transmission interface in a forward direction and can run to a receiving port on the slave unit, further through the slave and finally to the interface on the bus participant device that serves as the receiving interface in a forward direction.

If the passive master unit is also connected for reading to the bus (second switch mode) then the passive master can access any tap point on the data flow through the bus participant device. An internal receiving port on the master unit is connected with the tap point for this purpose.

If the bus participant device works as an active bus master (third switch mode), then in it, in a first switching variant of the function changer, with reference to the data flow through the bus participant device, one of the two interfaces of the participant device is connected respectively to one sending port and one receiving port on the slave unit, where one of these ports is active and one passive. The slave unit is connected to the master unit through a second set of sending and receiving ports and can thus forward data from the data bus to the master unit and pass data from the master unit to the data bus. This version is particularly well suited to operation on a data bus that is realized as a closed ring.

In an alternative switch version for the third switch mode the slave unit and the master unit can be connected in seriesinternally for a transmission direction of data telegrams through the bus participant device. This version is particularly well suited for operation on an open ring or string. If the bus participant device works in this direction, then data telegrams can be sent from the master unit to the slave unit. This data is received at the receiving port on the slave unit and runs, after passing through the slave unit, via its sending port to the interface on the bus participant device that works as the sending interface. It then runs through a string section on the data bus to its open end and is sent back from there to the bus participant device, where the interface that was previously operated as a sending interface now works as a receiving interface. One of the switches in this switching version thus means, for data that arrives in the other direction, that only that slave unit takes part in the further transmission that passes the data, from the interface that is working as a receiving interface in the other direction, to the interface that is now working as a sending interface on the bus participant device. This is connected with the second string section on the data bus between the bus participant device and a second end of the data bus. At this end data is sent in the original transmission direction back to the bus participant device where it arrives at the interface of the bus participant device from which it was sent last and that is now working as a receiving interface. The data is passed from there to the receiving port on the master unit and processed particularly here. The slave unit has a double set of sending ports and receiving ports (media redundancy) in order to be able to achieve the named functionality.

In one version the slave unit and the master unit can have a double set of receiving ports and sending ports each. Then one receiving port and one sending port on the master unit and the slave unit can be each connected with each interface on the bus participant device. Internally, the master unit and the slave unit are connected in both directions via the remaining internal ports. Then the decision can be made whether to forward in a forward or backward direction, which ports on the master unit and slave unit are to be used to receive and/or send and in what direction the internal communication between the master unit and the slave unit should run. One advantage of a second master interface is the re-use of information on travel times between bus participants if the break in the ring is close to the master interface that functions as the sending interface in normal operation.

The invention can be used in particular for equipment for which high availability is required.

The individual aspects of the description submitted here can be summarized in brief as follows:

1. Use of a hybrid for the realization of a master redundancy, comprising standard master and standard slave components with switch logic.
2. Monitoring and secure hardware shutoff for the faulty active master by the local slave with monitoring function.
3. Activation of a passive master by the local slave following failure of the active master.
4. Information for switches is gained from the information flow of the bus itself.
5. The local slave of the active master can serve as the reference clock. Switch logic in the function changer ensures that the participants in the network remain synchronous even after the master changes, without additional effort.

An explanation of an exemplary embodiment of the invention is given below using drawings. Objects or elements that correspond to one another are given the same reference numbers in all figures.

The exemplary embodiment any other exemplary embodiment is not to be understood as limiting the invention. Rather, changes and modifications are certainly possible within the scope of this disclosure, particularly versions and combinations that can be recognized by an expert with regard to the solution of the problem, for example by variation or combination of individual features and/or elements and/or method steps that are described in the general or specific description section or contained in the claims and/or the drawing and that by combinable features lead to a new subject matter or to new method steps or sequences of method steps.

It is shown in

Figure 2:
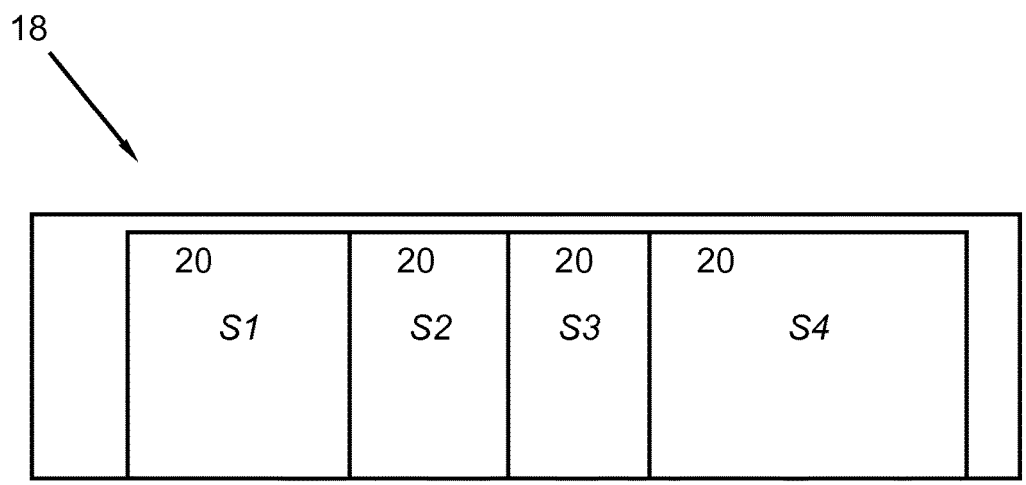
Figure 3:
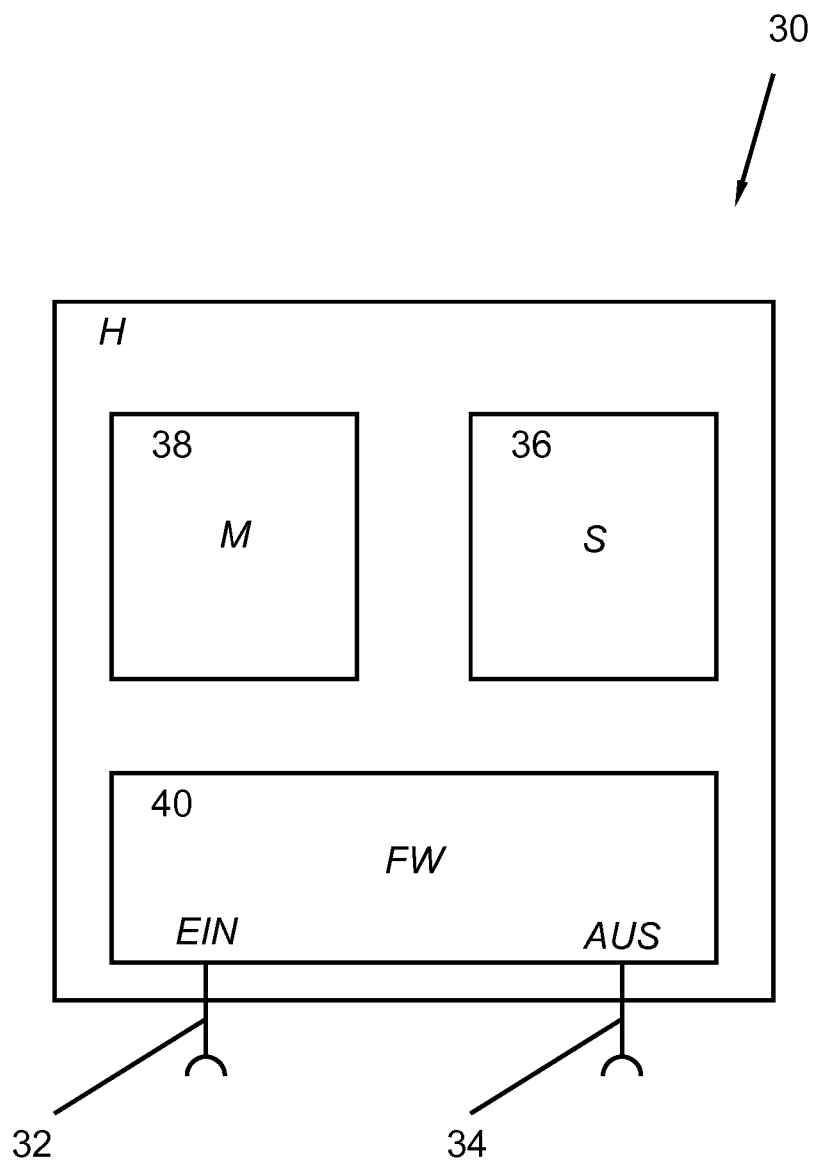
Figure 4:
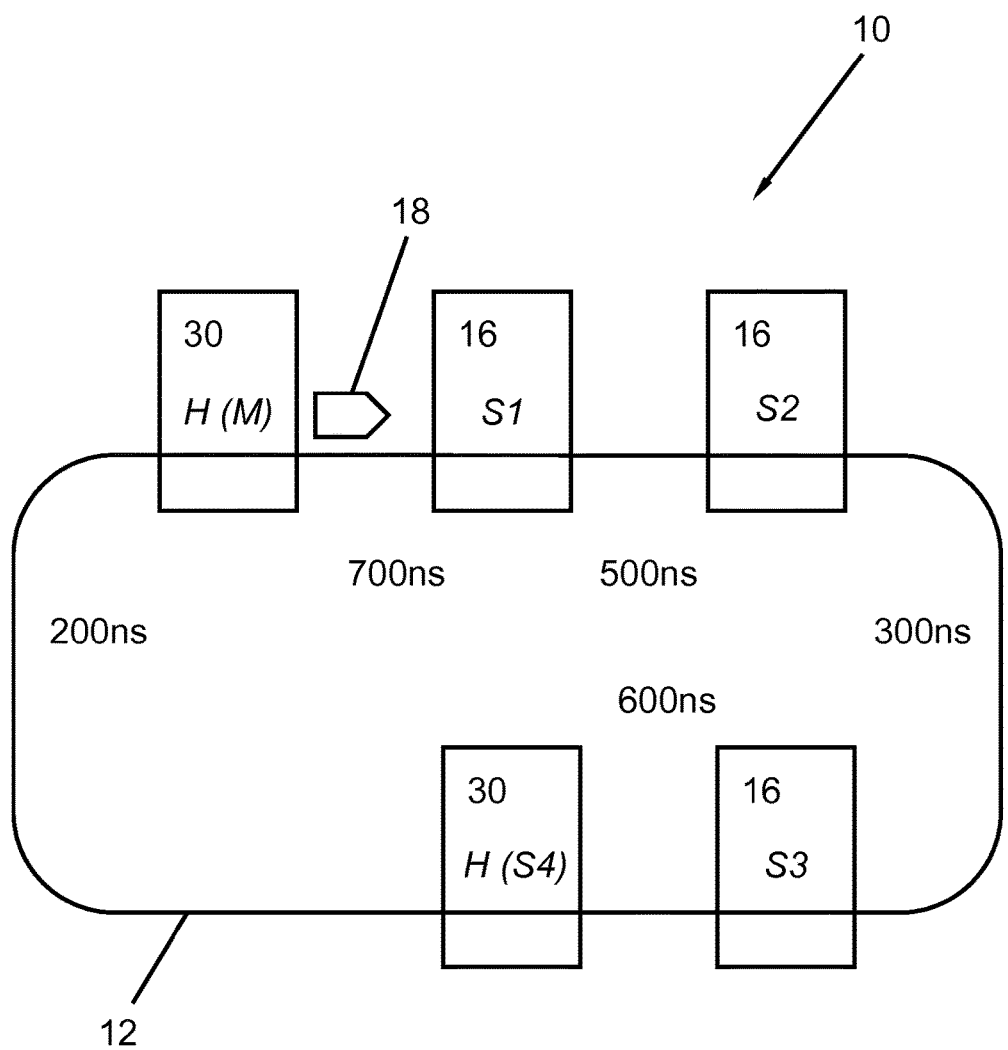
Figure 5:
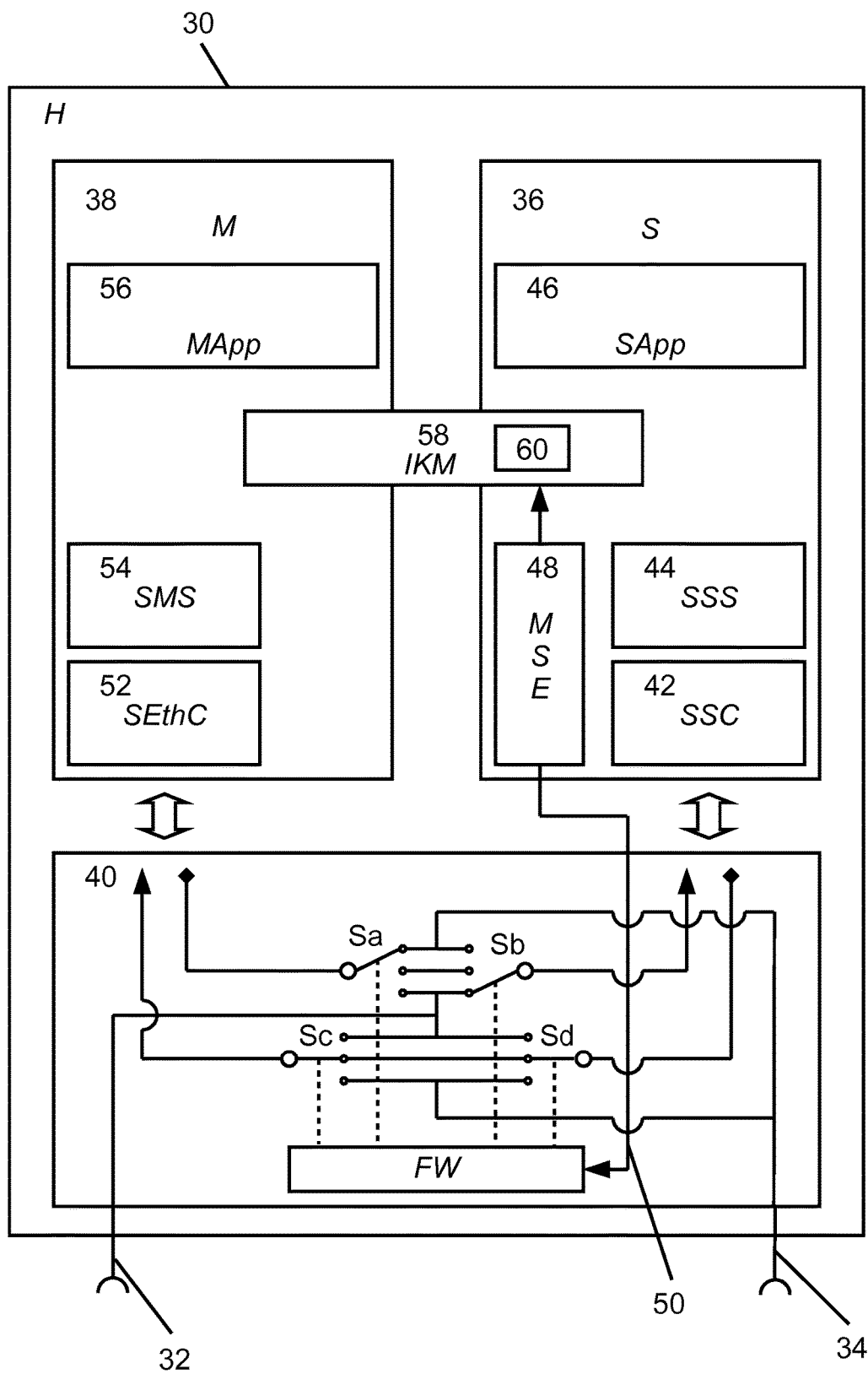
Figure 6:
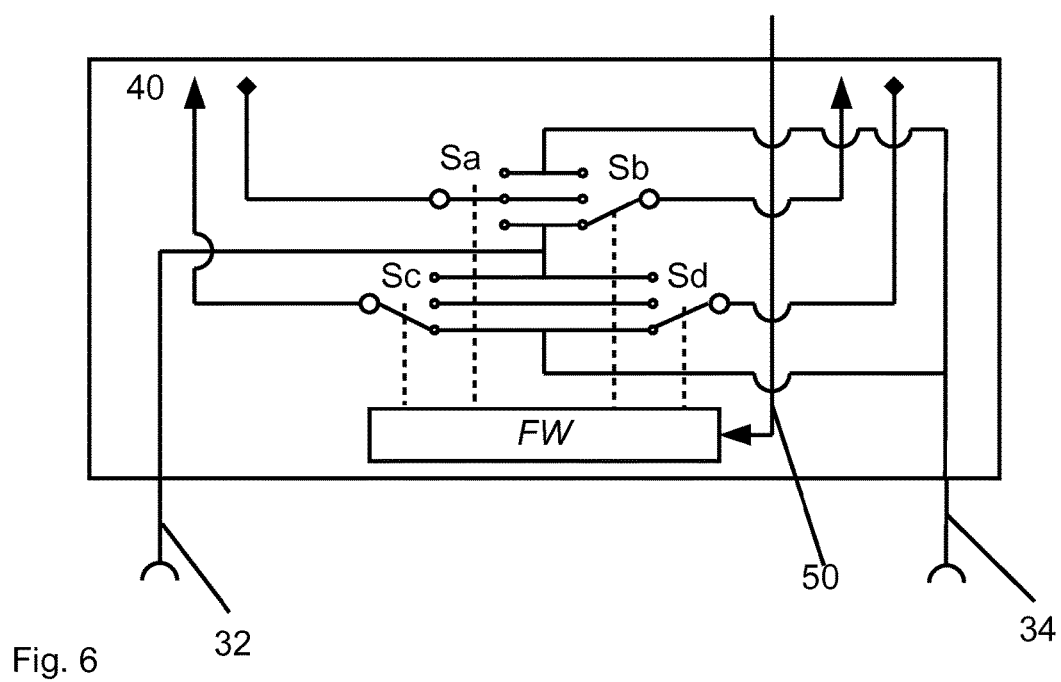
Figure 7:
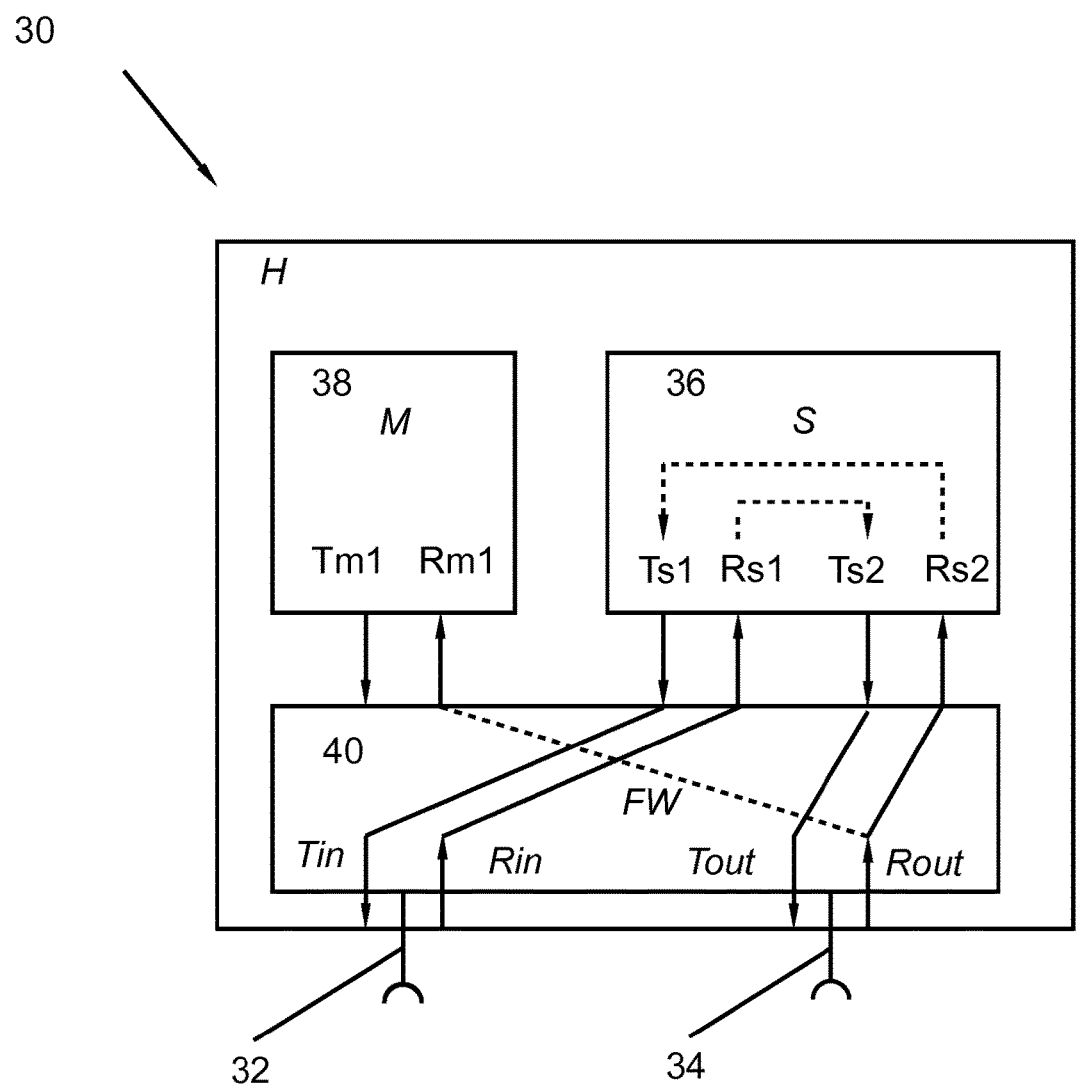
Figure 8:
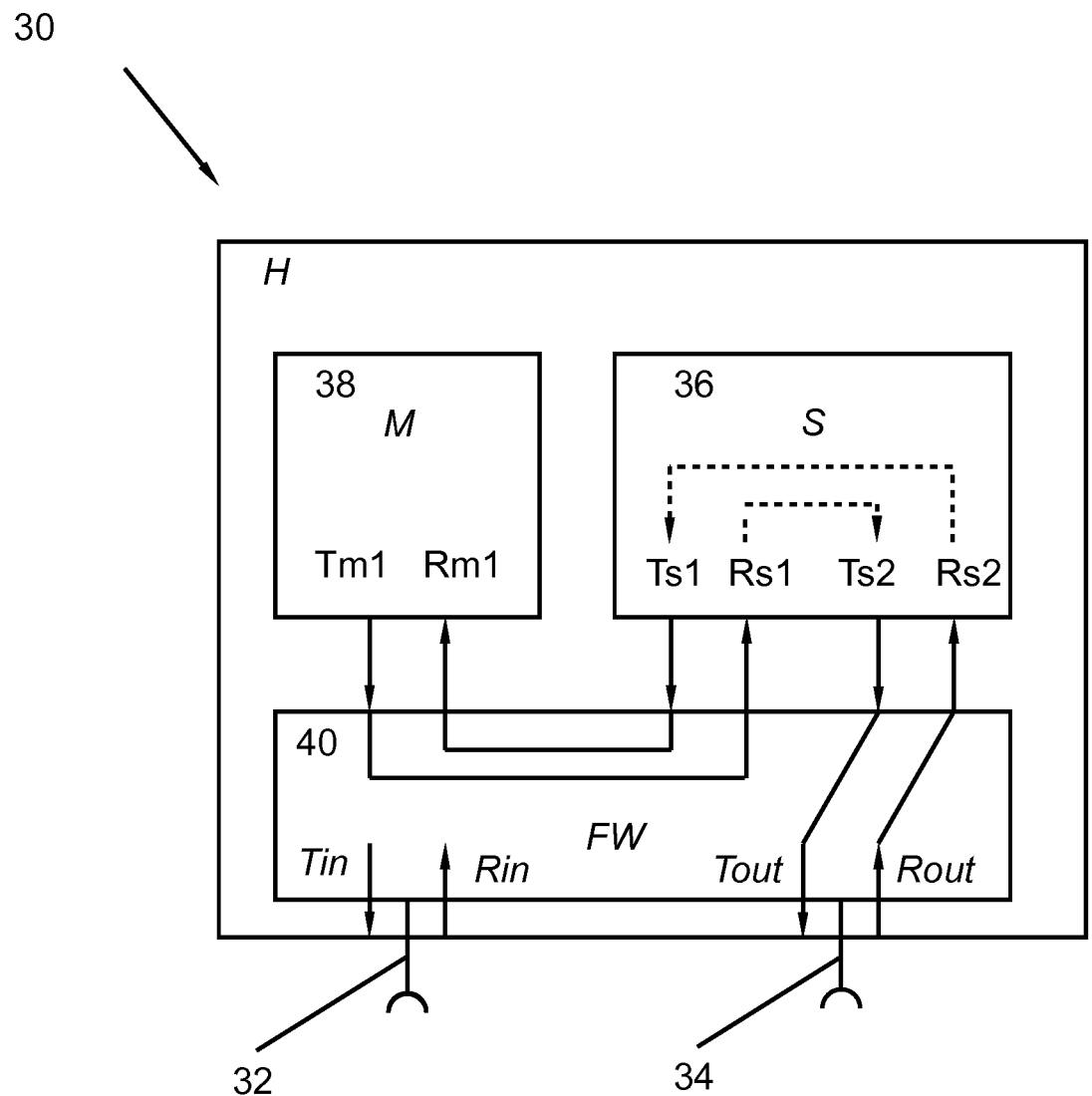
Figure 9:
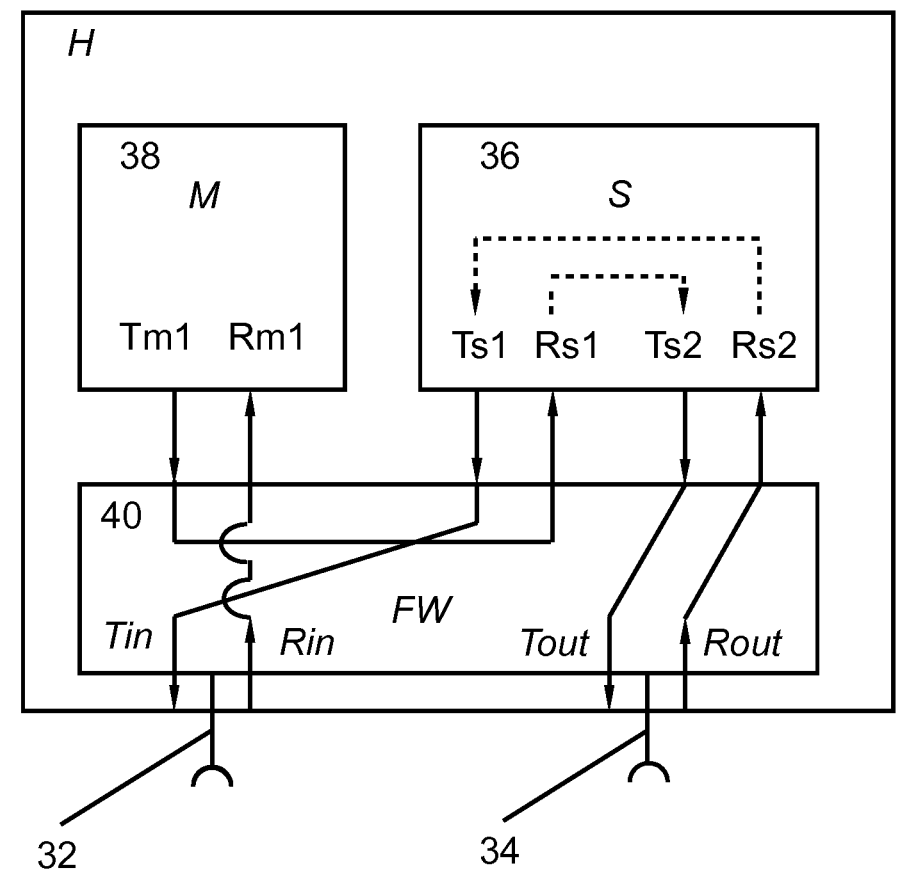

FIG. 1 A network with bus participants connected communicatively via a data bus, FIG. 2 A layout of a data telegram transmitted according to the summation frame method via the data bus, FIG. 3 A bus participant device of the type proposed here with a master unit and a slave unit comprised by it, FIG. 4 A network according to FIG. 1 with at least two bus participant devices in it functioning as communication participants and with travel times between the bus participants according to FIG. 3, FIG. 5 The bus participant device according to FIG. 3 with further details, specifically a function changer comprised by the bus participant device, without media redundancy of the slave, FIG. 6 The function changer with a different switch situation to FIG. 5, FIG. 7 A bus participant device according to FIG. 3, where the slave unit has a double set of receiving and sending ports, with the slave unit being connected to pass data telegrams in a forward and backward direction and the master unit being connected for reading, FIG. 8 A bus participant device according to FIG. 7 with the slave unit connected to send and receive in one direction and FIG. 9 A bus participant device according to FIG. 7, with the slave unit and the master unit connected to send and receive in forward and backward directions.

The representation in FIG. 1 shows in schematically simplified form a network 10 according to the state of art with bus participants that are communicatively connected to one another via a data bus 12, where one functions as bus master (master) 14 and the others as slaves. The master 14 and the slaves 16 are also marked symbolically, to further differentiate them in the representation, with 'M' and/or 'S1', 'S2', 'S3' and 'S4'. The communication via the data bus 12, referred to in the following also in brief as bus 12, takes place using data telegrams 18 sent from the master 14 and received by slaves 16.

The representation in FIG. 2 shows in schematically simplified form a layout of a data telegram 18 also referred to in the following in brief as telegram 18. In principle the structure of a telegram 18 transferred via bus 12 according to the summation frame method is known, so that we can refer to the specialist literature in this regard. The telegram 18 comprises a section 20 clearly allocated to the slave 16 for each slave 16 connected to the bus 12. Furthermore, a telegram 18 can also only comprise sections 20 for a subset of the connected slaves 16. In marginal cases each telegram comprises exactly one section 20 for exactly one slave 16. The data telegram can also comprise control information.

A telegram 18 that is sent from the master 14 is received by each slave 16 connected to the bus 12. Each slave 16 extracts the input data that is destined for it from the data flow that flows past it from the section 20 and copies its output data in a predetermined portion of its section 20. The telegram 18 that is thus modified as necessary is then passed to the next slave (hop-to-hop method) or sent back. The latter is explained below in an example.

The representation in FIG. 3 shows, in schematically simplified form, an embodiment of a bus participant device 30 pursuant to the approach presented here. The bus participant device 30 is intended and configured for operation on a serial data bus 12 pursuant to FIG. 1 and to that end comprises means for connection to such a data bus 12 as well as for receiving a data telegram 18 transmitted according to a hop-to-hop method via the data bus.

The means cited are an interface 32 and an interface 34. However, also included among the means for receiving a data telegram 18 transmitted according to a hop-to-hop process via the data bus 12 is a slave unit 36 (symbolically marked "S") comprised by the bus participant device 36. By means of the slave unit 36, when the master 14 is functioning correctly, i.e. in normal operation, the bus participant device 30 on the data bus 18 functions as a slave 16 (FIG. 1). In addition to the slave unit 36, the bus participant device 30 also comprises a master unit 38 that can be activated (symbolically marked "M").

By means of the slave unit 36, through which, in normal operation, the bus participant device 30 in the data bus 12 functions as a slave 16, the sending of data telegrams 18 via the data bus 12 can be monitored.

Depending on a result of the monitoring, it is possible, by means of the slave unit 36, to activate the master unit 38 comprised by the bus participant device 30. In operation, depending on the result of monitoring, such activation may take place. After such activation, the bus participant device on the 30 on the data bus 12 with its master unit 38 functions as a master for the data bus 12 and in series with its slave unit 36 continues to function as slave 16.

Because the bus participant device 30 can thus function on the data bus 12 either as a slave 16 with bus off-master or as a slave 16 with a passive master 14 or as a slave 16 with an active master 14, the bus participant device 30 will also be hereinafter occasionally referred to in brief only as hybrid 30 (symbolically "H"). For connecting the slave unit 36 and/or the master unit 38 to the data bus 12, the bus participant device 30 (the hybrid 30) comprises a function switcher unit 40 hereinafter occasionally also referred to in brief as function switcher 40 (symbolically: "FW").

The representation in FIG. 4 is essentially a repetition of the representation in FIG. 1, so that reference is made to the explanations there. In contrast to the representation in FIG. 1, the network 10 comprises two bus participant devices 30 pursuant to FIG. 3, i.e. a first and a second hybrid 30. One of the hybrids 30 functions, for example based on a corresponding configuration, on bus 12 as a master 14 (symbolically: "H (M)"). The other hybrid 30 functions on bus 12 as a slave (symbolically: "H (S4)"). In normal operation, the hybrid 30 functioning as an active master 14 works on the bus 12 like a "normal" master 14 (FIG. 1) and normally cannot be distinguished by the other communication participants from a normal master 14. The hybrid 30, which in normal operation functions as a slave 16, appears on the bus 12 to all other communication participants as a "normal" slave and is thus also not distinguishable from a normal slave 16. The number of hybrids 30 on the bus 12 is in principle not limited. Moreover, it is also not necessarily required that two hybrids 30 be connected to the bus 12. The master function can in principle also be assumed by a "normal" master 14 (FIG. 1). As at least one hybrid 30 is connected to the bus 12, in the event of a failure or failure of the master 14 or of one of the hybrids 30 functioning as master, the master unit 38 of the hybrids 30 is available as a redundant master 14. As the hybrid 30, namely its master unit 38, assumes the master function in the event of an error, the continued operation of the network 10 is ensured.

A hybrid 30 on the bus 12 that initially functions (only) as a slave 16 monitors the sending of data telegrams 18 via the data bus 12 in a manner that is transparent to the other communication participants. Moreover, the representation in FIG. 5 shows the hybrid 30 pursuant to FIG. 3 with additional details.

The slave unit 36 initially comprises a slave controller 42 (symbolically: "SSC" for standard slave controller" that is in principle known in and of itself, as well as a slave stack 44 (symbolically: "SSS" for "standard slave stack") that is in principle known in and of itself. Thus the takeover of data from a telegram 18 received by the hybrid 30—in its function as a slave 16—as well as the handover of data into such a telegram 18 is possible. This is illustrated in the representation by the double block arrow from and to the slave unit 36.

The respective function of the slave unit 36 is determined by a control program 46 (symbolically: "SApp") that is loaded into a memory of the slave unit 36 that is provided therefor and not shown separately. The control program 46 of the slave (application 46) determines the slave function of the bus participant device 30. The control program 46 can access the data to be taken over from the telegram 18 as input data and provide the data to be handed over to the telegram 18 as output data.

In contrast to a "normal" slave 16, the slave unit 36 of the hybrid 30 comprises a master control unit 48 (symbolically "MSE" for "Master-Steuereinheit"), which will hereinafter occasionally also be referred to in brief as control unit 48. The aforementioned monitoring of the sending of telegrams 18 via the bus 12 by the slave unit 36 takes place by means of this master control unit 48. Depending on the result of the monitoring, by means of the control unit 48—and thus through the slave unit 36 comprising the control unit 48—the master unit 38 comprised by the bus participant device 30 is activated when by means of the control unit 48 the function switcher 40 is controlled within the meaning of such activation. For such activation to occur, the control unit 48 produces a switching signal 50, which effects or at least initiates the activation.

The bus 12 runs in the hybrids 30 from an interface 32 to an interface 34, the bus 12 running through the function switcher 40. In the function switcher the data bus 12 in the embodiment shown runs via four switches, Sa, Sb, Sc and Sd, with which it is possible to switch between the first, second and third switching mode.

By means of the embodiment of the function switcher 40 shown, it is possible to connect with the bus 12 only the slave unit 36, the master being separated from the bus (bus-off master, first switching mode) or to connect the passive master unit 38 for reading only and the slave unit 36 (second switching mode) or to simultaneously connect on the slave unit 36 and the active master unit 38 for reading and writing and in series (third switching mode). Accordingly, the function switcher 40 has at least three switching modes, namely, a first, second and third switching mode.

In the first switching mode, only the slave unit 36 of the hybrid 30 is connected to the bus 12 and the master is switched to bus-off. In a slave operation, in normal operation the bus participant device 30 works exclusively as a slave. For a standard operating direction on a ring-shaped data bus, the interfaces 32 and 34 of the bus participant device have only one function each, namely, either as sending interface or as receiving interface.

In the second switching mode the master unit 38 of the hybrid 30 is passively connected to the bus 12, i.e., connected to the data bus for reading. The master unit 38 can thus also read the traffic on the data bus 12. Thus, it can receive data that brings it at least partially, preferably at least approximately, to the same information status as the active bus master 14. The active bus master may send data with information on its condition. For a standard operating direction on a ring-shaped data bus, the interfaces 32 and 34 of the bus participant device have only one function each, namely either as transmitting interface or as receiving interface.

In the third switching mode the slave unit 36 is connected to the bus 12 for reading and for writing and the active master unit 38 of the hybrid 30 is connected only for reading in series to the slave unit 36 on the bus 12. The interfaces 32 and 34 of the bus participant device can each work as a sending interface or a receiving interface, so that the bidirectional operation of the bus participant device is possible.

The representation in FIG. 5 shows the function switcher 40 in the third switching mode (3), in which the slave unit 36 and the master unit 38 are connected to the bus 12 in series. Thus, the slave unit 36 and the master unit 38 are connected to the data bus 12 via the interfaces 32, 34 in such a way that both units 36, 38 can receive incoming telegrams 18. The slave unit 36 can forward a telegram 18 received. The master unit 38 can send its own telegram 18. Here receiving occurs via the connection of the respective unit 36, 38 to the interface 32. The forwarding or sending takes place via the connection of the respective unit 36, 38 to the interface 34. This corresponds to the switching status of the function switcher 40 shown symbolically in FIG. 5.

In the second switching mode the slave unit 36 and the master unit 38 are connected to the data bus 12, namely, to the interfaces 32, 34, in such a way that both units 36, 38 can receive incoming telegrams 18. The slave unit 36 can forward a received telegram 18, while the master unit 38 itself cannot send. The slave unit 36 is connected to the interfaces 32, 34, while the master unit 38 is connected only to the interface 32. By means of a status of the function switcher 40, one of the units 36, 38 of the hybrid 30 is connected to one of the interfaces 32, 34, so that the respective interface 32, 34 is connected through to the respective unit 36, 38. To this end, the switches of the function switcher 40 are brought into a corresponding switch setting.

In the series switching of the slave unit 36 and the master unit 38 in the second switching mode not only the slave unit 36 but also the master unit 38 of the hybrid 30 receives each telegram 18 transmitted via the bus 12. Thus, the master unit 38 also listens in, so to speak, to the data traffic on the bus 12. The bus master 14 can send specific data, for example, concerning its status. Thus, as a result, the passive master has access, partially or at least approximately and preferably constantly, to the same data as the current bus master 14. This ensures that in the event of a failure of the bus master 14, the master unit 38 can take over the function of the bus master 14 nearly without a hitch.

In order to overhear the data traffic on the bus 12 as well as to send and receive telegrams 18 as bus master 14, the master unit 38 comprises an Ethernet controller, known in and of itself (symbolically: "SEthC" for "Standard Ethernet-Controller") as well as a master stack 54 (symbolically: "SMS" for "Standard Master Stack") also known in and of itself. The respective function of the master unit 38 is determined by a control program 56 (symbolically: "MApp") that is loaded into a memory of the master unit 38 intended for this and not shown separately. If the hybrid 30 (also) works as a master 14 on the bus 12, the control program 56 (application 56) sends the respective telegram 18. Upon receiving a telegram 18, the hybrid 30 analyzes the data entered in the telegram 18 by the slaves 16. In the second switching mode the hybrid 30 on the bus 12 functions only as slave 14, and in that case as a result of a switch setting of the function switcher 40 that allows the master unit 38 to overhear the data traffic on the bus 12, the application 56 analyzes the data entered by the slaves 16 in the overheard telegrams 18.

The data transmission from and to the master unit is illustrated in FIG. 5 by the double block arrow between the function switcher and the master unit 38. The master control unit 48 functions as means for the already mentioned monitoring of the sending of telegrams 18 via the bus 12 by the slave unit 36. Here, the control unit 48 functions as a means for monitoring a time interval between the receipt of a data telegram 18 and the data telegram 18 that immediately follows it and as a means for comparing the respective time interval with a threshold that has been or may be predefined. If the interval exceeds the threshold, then by means of the control unit 48—and thus by means of the slave unit 36 that comprises it—the internal switching over of the hybrid 30 and the activation of the local master unit 38 may be effected. The control unit 48 thus functions as a watchdog.

Accordingly, one means to be considered for comparing the respective time interval with the threshold might be, for example, a decrementing counter that, upon receipt of each telegram 18, is set to a starting value corresponding to the threshold and started, and the expiration of that value then indicates that the threshold has been exceeded. In this manner the slave unit 36, by means of its master control unit 48, can monitor whether the respective bus master 14 regularly delivers telegrams 18 on the bus 12. If the bus master 14 fails or there is another failure that prevents the regular sending of telegrams 18, this is automatically detected by means of the control unit 48. As a response to the detection of the threshold having been exceeded, the switching signal 50 is automatically issued and the switching over is effected.

In order to allow the master unit 38 to actively send telegrams 18, the master unit 38 is connected through to the interface 32 and the interface 34. The function switcher 40 is then in a switching status as shown in the representation in FIG. 5 (third switching mode). As long as the master unit 38 has no sending right, and only overhears the data traffic on the bus 12 as a passive master 14 (second switching mode), then, contrary to the medium switch setting shown in FIG. 5, the switches marked there symbolically with "Sc" and "Sd," for example, are in a lower switch position (so that each telegram 18 received by the slave unit 36 and possibly modified there, arrives at the master unit 38 and simultaneously at the interface 34); likewise, contrary to the upper switch position shown in FIG. 5, the switch marked "Sa" is then in a medium switch position (so that the master unit 38 is not connected through to the interface 34).

The resulting switch setting (second switching mode) of the function switcher 40 is shown in the representation in FIG. 6. Here it must also be pointed out that the representation of the function switcher 40 in FIG. 5 and FIG. 6 and the switch elements shown there as simple switches are to be understood only as a symbolic representation for the purpose of illustrating the communication paths, the possible switching processes and the (switch) statuses.

If the result of the monitoring that is determined by the control unit 48 means a change in status, the control unit 48 informs the master unit 38 directly of the status change necessary there, namely, of a status change from a current passive status and mere overhearing of telegrams 18 transmitted via the bus 12 to an active status of taking over the function as bus master 14. In addition, the control unit 48 generates a switching signal 50 for switching the function switcher 40.

To this end, the hybrid 30 has a means of communication 58 to allow direct communication between the slave unit 36 and the master unit 38, particularly in the form of a register or memory area accessible to the slave unit 36 and the master unit 38. Symbolically—however without waiving any further general applicability—the communication means 58 is marked in the representation in FIG. 5 with IKM ("Internes Kommunikationsmittel" [internal means of communication]). In the simplest case, the communication means 58 is a single bit of a memory cell (flag). Possibly, it may also be a mailbox realized with the customary access controls. In principle, the communication means 58 may also be distributed memory areas, namely, a memory area on the part of the slave unit 36 and a memory area on the part of the master unit 38. The memory contents or individual memory areas can be copied regularly back and forth from one to the other according to a predefined pattern and in particular by a superordinate unit.

The following description—and once again without waiving any further general applicability—continues with the example of an internal communication means 58, which has the form of a memory area that is accessible both to the slave unit 36 and the master unit 38. In order to activate the master unit 38 the control unit 48 writes a predefined value in a master control register 60 that is monitored regularly by the master unit 38. The predefined value—for example "1"—signals to the master unit 38 that a switch from the current passive status to the active status is required and that the master unit 38 should take over the function as bus master 14 on the bus 12.

As soon as the master unit 38, in the course of the regular monitoring of the status of the master control register 60, detects the request to assume the function as bus master 14, the master unit 38 switches over internally and from then on functions on the bus 12 as a master 14. The connecting through to the interface 34 and thus the possibility for the master unit 38 to be able to actively deliver telegrams 18 to the bus 12 occurs as a result of the switching over of the function switcher 40. Due to the current passive overhearing of the data traffic on the bus 12, the master unit 38, which is to function in the future as bus master 14, has the data necessary for this change.

The activation of a currently passive master is known in and of itself by the keyword master switching or master redundancy, and in this respect no additional explanations appear to be necessary and reference is made to the relevant prior art.

Below, options for communication with the master unit 38 comprised by a hybrid 30 will be described. Here, the issue is initially not whether the master unit 38 is passive or whether the master unit 38 functions on the bus 12 as a bus master 14. Because the following description also refers to additional communication participants connected to the bus 12 and because the communication can take place with an additional hybrid 30 and a slave unit 36 comprised by it, the slave unit 36 that belongs to the same hybrid 30 as the master unit 38 with which the communication is to take place is designated as the local slave unit 36, and a distant communication participant in the form of a slave unit 36 comprised by an additional hybrid 30 is designated as the distant slave unit 36.

Since a passive and active master unit 38 on the bus 12 is not visible to other communication participants, it may be provided that for the sending of data to the active and passive master unit 38 these data to be transmitted, within the scope of a communication by means of the exchange of one or more process data objects (PDO) or service data objects (SDO), are addressed to the local slave unit 36 of the hybrid 30. To this end the local slave unit 36 analyses incoming process data objects or service data objects and forwards data intended for the master unit 38 directly to an address area of a memory of the master unit 38, or it reads data from there and forwards that data to the bus 12. These data may be commands to the passive and active master, such as bus-off/active/passive. Via the slave unit 36, the passive and active master can also forward status information, such as the master status bus-off/active/passive and/or one or more pieces of error counter information. Connecting or disconnecting manually for maintenance purposes by the user or by the application is also possible in a special mode.

The local slave unit 36 in many cases functions as an access gate or relay to a passive and active master unit 38. Because PDO or SDO communication are used here, the slave unit 36 and the master unit 38 of a hybrid 30 can essentially be executed like a "normal" slave 16 or a "normal" master 14 that communicate, in particular, in the background via a joint memory area. The master unit 38 can also be tied via another type of internal communication to the slave unit 36, particularly via customary internal bus systems or via direct, e.g., parallel data port connections of the master unit 38 and the slave unit 36.

The bus participant device 30 provides that a slave unit 36, within the scope of monitoring the transmission of data telegrams 18 via the bus 12, can not only—as described above—activates the master unit 38 comprised by said bus participant device 30, but can also deactivate an active master unit 38. This may be a master unit 38 that can be arranged in the same bus participant device 30 as the switching-off slave unit 36, but it can also be a master 14 connected via the data bus 12. This makes the previously proposed bus participant device 30, and especially the slave unit 36 comprised by it, to an even greater extent a controller on bus 12. When referring below to a slave unit 36 and a master unit 38 as both being the units 36, 38 comprised by one and the same bus participant device 30, the respective unit 36, 38 will hereinafter be designated as hybrid unit 36, 38. Accordingly, starting from a master unit 38 the hybrid slave unit 36 is thus the salve unit 36 comprised by the same bus participant device 30 to which the master unit 38 also belongs.

One conceivable scenario for the automatic deactivation of an active master unit 38 by a hybrid slave unit 36 occurs when the master unit 38 still continues to regularly send out telegrams 18, but those telegrams 18, for example, exhibit a high degree of errors. As the hybrid slave unit 36 monitors the transmission of the data telegrams 18 via the bus, it can detect such a situation and render the hybrid master unit 38 passive. The automatic passivation takes place by means of the master control unit 48 and a switching over signal 50 generated by it. Because due to a resulting switching status of the function switcher 40 at least the switching through of the interface 34 on the master unit 38 is terminated, telegrams 18 from the master unit 38 can no longer arrive at the bus 12. The absence of the telegrams 18—as described above—is detected by a slave unit 36 of an additional hybrid 30 connected to the bus 12. This unit then activates its hybrid master unit 38, so that the latter then takes over the function as bus master 14. Upon the automatic passivation of a master unit 38, the master control register 60 can also be set accordingly by means of the control unit 48. If the master unit 38 is still operational at least to the extent that an analysis of the master control register 60 is possible, then in this manner an orderly change of the state of the master unit 38 can be effected within the scope of a functionality of a software system of the master unit 38 that is superordinate to the control program 56.

Another option for monitoring the transmission of data telegrams 18 by a slave unit 36 on the basis of which the of the hybrid master unit 38 can automatically be passivated is the monitoring of a so-called working counter, i.e., of that counter that monitors whether a telegram 18 sent by a bus master 14 has reached all the groups of slaves 16 connected to the bus 12. In particular, a working counter is used in the summation frame method in order to register the processing of a data telegram when passing through a bus participant. For this purpose, the value of the working counter is altered. In the event of one or more errors expressed by the status of the working counter, the slave unit 36 can automatically passivate its active hybrid master unit 38, and in this case it may be provided that for the passivation to be triggered, the number of errors must exceed a threshold. The passing on of the bus master capacity to another master unit 38 then takes place as described above. Monitoring of the working counter may take place in the manner of a watchdog as known from the monitoring of program runs, particularly in the slave unit or the master unit of the bus participant device.

In addition or alternatively, there is also the option of analyzing the data generated by the passive master unit 38 based on the continual overhearing of the data traffic on the bus 12. Normally it is to be anticipated that an active master unit 38 and a passive master unit 38 will generate the same data based on the same data received from the slaves 16 as well as based on an identical control or testing program 56. The data generated by the active master unit 38 are found, at least in part, in the telegrams 18 that are issued by the latter on the bus 12. The hybrid slave unit 36 of a passive master unit 38 can automatically compare the data received with a telegram 18 with the data generated by its hybrid master unit 38. In the event of errors, especially if a threshold defined in terms of amount and/or frequency of errors has been exceeded, the respective slave unit 36 can automatically passivate its hybrid master unit 38. Here, too, the passing on of the bus master capacity to another master unit 38 takes place as described above.

FIG. 7 shows two separate slave interfaces on a slave unit 36 of a hybrid H that can be switched independently of one another. This allows a ring wiring of the data bus. In particular, but not exclusively, in the event of low availability requirements linear wiring may also be realized, and this may also have branchings.

For synchronous processing of the applications in the master 14, 38 and in the slave 16, 36 their local clocks must be synchronized with one another. The local clocks are customarily arranged in each of the slaves in the network. For synchronization, the time of a selected clock (reference clock) is transmitted by the master 14, 38 to at least one but preferably to all slaves 16, 36. This clock is realized in the local slave 36 of the active master unit 38. The deviations of the other clocks can be measured in hardware by the respective slave 16, 36 and can be read and compensated for by the active master, and in the process the chronological delays caused by the transmission are detected and offset. These delays are dependent on the position of the participants on the data bus 12 and can be adjusted in the event of changes. Through the activation of a substitute master, the sequence of the slave administered by it is altered. Therefore, it is proposed that the position-dependent delays be recalculated during or after a change of master. In this way the existing synchronization can be continued and a time-consuming resynchronization can be avoided.

In a data bus with a ring structure, which is shown in FIG. 4, the delay times in both directions each comprise
between H(M) and S1: 700 ns,
between S1 and S2: 500 ns,
between S2 and S3: 300 ns,
between S3 and H (S4): 600 ns and
between H(S4) and H(M): 200 ns.

In the example, the delay time between the hybrid H(M) and the slave S2 is 700+500 ns. The reception time in the slave 2 is corrected by 1200 ns compared to the time sent from the slave 36 of the hybrid 30 of H(M). For example, if the master H(M) fails completely and the ring is thereby interrupted, the new master H (S4) reaches the slave 2 via the path H(S4), S3, S2. As a result, the delay is now 600+300. Therefore, the reception time in the slave 2 is corrected by 900 ns. The new delay time can be determined through the addition of delays already known. The passive master can make this calculation, which is necessary in the case of switching over, already during the passive phase. Preferably, after a change of master, the corrections are made first, with the resynchronization following after that.

The method described just above for resynchronization requires that the delay times are known. The redetermination of the synchronization may take place through parameterization or through a dynamic calculation. With dynamic calculation, the difference in reception times of the unit to be synchronized is deducted from the difference in reception times of its successor unit in the serial arrangement of bus participants, and the result is then halved. This method is known and will not be further discussed here. In most cases, the method using a reception time stamp is already integrated into the slave. At an interface of the hybrid H(M) that acts as a receiving interface, however, this is normally not supported by standard components if the ring is open. Therefore, this function can be realized by means of an additional device (e.g., a timer). Many slaves already comprise supporting hardware for this process.

FIG. 7 shows a bus participant device 30 that comprises a master unit 38, a slave unit 36 and a function switcher 40. The function switcher effects a switching connection between the internal ports Ts1, Rs1, Ts2, Rs2, Tm1, Rm1 of the slave unit 36 and the master unit 38 as well as to the interfaces 32 and 34 of the bus participant device 30; this connection corresponds to the first and second switching mode of the bus participant device 30.

The data sent by the active master reach the hybrid on the interface 32, which works as a receiving interface. The data are then forwarded via the function switcher 40 to the slave unit 36. There they reach Ts2, and via the interface 34, which works as a send interface, they leave the hybrid 30 in order to then pass through other, preferably all, slaves, starting with the next slaves all the way to one of the physical ends of the bus. Accordingly, at the first open port of a succeeding slave, the data are sent back, and at the interface 34 they once again reach the bus participant device 30. There the data are forwarded by the function switcher 40, via Rs2, Ts1 of the slave unit 36 and Tin, to the next slave in the direction toward the master.

The master unit 38 also receives the data received by the slave unit 36. In FIG. 7 the receiving port Rm1 of the master unit 38 is, for example, connected to the interface 34 of the bus participant device 30, which is simultaneously connected to the receiving port Rs2 of the slave unit 36. In this example the interface 34 works as the receiving interface of the bus participant device 30, so that the master unit 38 also receives the data received. The slave unit 36 transmits the received data internally via its sending port Ts1 and sends the data via the interface 32. By means of its double set of sending and receiving ports Ts1, Rs1, Ts2, Rs2 in the switching shown, the slave unit 36 can forward data telegrams in both directions between the interfaces 32 and 34 of the bus participant device 30. To this end, the ports Ts1 and Rs1 are connected to the interface 32, so that the slave unit 36 can both send and receive on this interface 32. This applies analogously to ports Ts2 and Rs2 with respect to the interface 34. The bus participant device 30 can thus be operated as a slave according to a hop-to-hop method in both possible operating directions of the data bus 12. The slave unit 36 can merely pass the data through or process them further. The process is shown by the dashed arrows between ports Ts1, Rs1, Ts2, Rs2. For a use in which the data telegrams 18 can be received on the interface 32, the input port Rm1 of the master unit 38 may, unlike in the representation in FIG. 7, be connected with the interface 32 and with the receiving port Rs1 of the slave unit 36. However, it is also conceivable for the master unit 38 to receive data after it has been processed by the slave unit 36. FIG. 8 shows a bus participant device 30, which is also shown in FIG. 7, but here, however, the function switcher 40 effects a different switching connection between the internal ports of the slave unit 36, the master unit 38 and the interfaces 32 and 34 of the bus participant device 30. The interconnection corresponds to the third switching mode of the bus participant device 30, particularly for operation on a closed ring, which is preferred if the system is operating error-free. The master unit 38 works as a bus master and sends the data from Tm1 to the slave unit 36. From there the data are sent to the other slaves and again from the last open port back through all previous slaves and via Ts1 of the slave unit 36 back to Rm1 of the master unit 38. Since the master is located at a start and at an end of the chain of bus participants that receive messages sent by the master unit 38, the second interface 32 of the bus participant device 30 can remain internally unoccupied.

The interface 34 is connected to the transmitting port Ts2 and the receiving port Rs2 of the slave unit 36. The interface 34 is thus configured for transmitting as well as for receiving. Internally the slave unit 36 and the master unit 38 are coupled for bidirectional communication through the connection of ports Tm1 and Rs1 and Ts2 and Rm2. The slave unit 36 can thus forward data received and/or data further processed by it to the master unit 38 or receive data from the latter and forward these to the interface 34. The slave unit 36 may merely pass the data through or may also further process them. The process is represented by the dashed arrows between the ports s Ts1, Rs1, Ts2, Rs2.

FIG. 9 shows the bus participant device 30, which is also shown in FIG. 8, but here the function switcher 40 effects a different interconnection between the internal ports Ts1, Rs1, Ts2, Rs2, Tm1, Rm1 of the slave unit 36 and the master unit 38 to the interface 32 and the interface 34 of the bus participant device 30. The interconnection shown is suitable particularly for the operation of the bus participant device on a data bus 12 configured as a string or open ring. The master unit 38 and the slave unit 36 are interconnected with the interfaces 32 and 34 as in FIG. 8, but with the differences that not all returned data telegrams 18 end up at port Rm1 of the master unit 38. Because the send port Ts1 of the slave unit 36 is connected with the interface 32 in its function as a send interface, the data telegrams 18 are forwarded to the slaves in the connected segment of the strand of the data bus. Only the returning data telegrams 18 reach the receiving port Rm1 of the master unit 38 via the interface 32, which then works as a receiving interface. This interconnection is suitable for the third switching mode of the bus participant device 30 when operated in an open ring or strand. Such architecture may be intentional, but it may also be created through the break-up of the ring architecture of a data bus 12, for example, as a result of the failure of a slave 14 or a bus participant device 30 that in normal operation forward data telegrams 18 in the hop-to-hop method. A cable break may lead to the same consequences. From the master unit 38 data telegrams 18 can be sent via the slave unit 36, where the data pass from the port Tm1 of the master unit 38 to the port Rs1 of the slave unit 36 via the connection shown as dashed lines through the slave unit 36 to its transmitting port Ts2 and from there via the interface 34 and via bus participants not shown to one end of the strand. From the last bus participant the data are sent on in the opposite direction, and once again they arrive at the bus participant device 30. If the bus participant device 30 is located at the other end of the strand, the data telegram ends here; otherwise it is forwarded to a second strand segment that lies in the opposite direction from the first strand segment already traversed. Here the data telegram 18 passes via the interface 34 and the receiving port Rs2 in the slave unit 36, which transmits it via the internal connection, shown as dashed line, to the transmitting port Ts1, which is connected to the interface 32. From there the data telegram passes to the end of the second strand segment, where it is sent back by the last bus participant and finally arrives once again at the bus participant device 30. From here it is read via the receiving port Rm1 of the master unit 38. In this manner the bus participant device can receive feedback from all bus participants of a strand-shaped bus architecture, in particularly for the detection of errors on connected bus participants and/or for measuring the run times between bus participants. The latter information can be used by the master unit 38 to synchronize the other bus participants. For example, it may send a refresher telegram with new synchronization data to the bus participants. The synchronization data may be calculated, for example, from run times that are stored and/or that the master unit 38 has calculated from the bus participants' feedback.

The invention claimed is:

1. A bus participant device for receiving and sending data telegrams via a serial data bus according to a master/slave method, characterized in that the bus participant device comprises:
a master unit,
a slave unit with a Slave-Stack, a Slave-Controller, and a master control unit,
a function changer, controllable by the slave unit, and
an internal communication path for direct communication between the master unit and slave unit,
wherein the master unit of the bus participant device is configured to perform the monitoring of the data traffic on the data bus needed to assume the function of a previous master unit by the master unit of the bus participant device,
wherein the slave unit and the master unit, which is only activated for reading in a read-only mode for reading traffic on the data bus and not writable, are switchable in a second switching mode to the data bus,
wherein the master is configured to keep available data that an active bus master also has,
wherein monitoring outputs are communicable from the master unit to the slave unit,
wherein a switching to or from the data bus can be effected by the function changer as a reaction to a change-over signal from the slave unit,
wherein the master unit of the bus participant device is monitorable and activatable and deactivatable by the slave unit of the bus participant device on the basis of data telegrams on the data bus.

2. The bus participant device in accordance with claim 1, characterized in that the bus participant device is configured for direct communication between the master unit and the slave unit via the internal communication path,
wherein the bus participant device is configured such that communication occurs via:
a storage area accessible by the slave unit and the master unit, or
traditional internal bus systems, or
direct parallel data port connections.

3. The bus participant device in accordance with claim 1, characterized in that the bus participant device is switchable between the following switching modes by the function changer:
the slave unit is switched to the data bus in a first switching mode without a master unit;
the slave unit is switched to the data bus in a second switching mode with a master unit activated only for reading; and
the slave unit and the active master unit are switched in series to the data bus in a third switching mode for reading and writing.

4. The bus participant device in accordance with claim 1, characterized in that the master control unit is connected to the function changer and the internal communication path.

5. The bus participant device in accordance with claim 1, characterized in that switching is possible via the function changer, between: the following internal ports of the slave unit:
first sending port of the slave (Ts1),
first receiving port of the slave (Rs1),
second sending port of the slave (Ts2),
second receiving port of the slave (Rs2), and
the following internal ports of the master unit:
sending port of the master (Tm1),
receiving port of the master (Rm1), and
the interfaces of the bus participant device.

6. The bus participant device according to claim 1, characterized in that, in a first switching mode, the master unit is disconnected from the data bus,
wherein the bus participant device is configured to function as a slave,
wherein the slave unit is equipped with a double set of receiving and sending ports, and
wherein the function changer is switched such that
the first sending port (Ts1) of the slave unit is connected to the interface of the bus participant device, and
the first receiving port Rs1 (Rs1) of the slave unit is connected to the interface of the bus participant device, and the second sending port (Ts2) of the slave unit is connected with the interface of the bus participant device, and
the second receiving port (Rs2) of the slave unit is connected with the interface of the bus participant device.

7. The bus participant device according to claim 1, characterized in that the slave unit is equipped with a double set of sending and receiving ports, and in a second switching mode, the master unit is passive and can be switched to the data bus only for reading and the slave unit to the data bus,
wherein the function changer is switched such that:
a receiving port (Rm1) of the master unit is connected to the interface of the bus participant device, and
a first sending port (Ts1) of the slave unit is connected to the interface of the bus participant device, and
a first receiving port (Rs1) of the slave unit is connected to the interface of the bus participant device, and
a second sending port (Ts2) of the slave unit is connected to the interface of the bus participant device, and
a second receiving port (Rs2) of the slave unit is connected to the interface of the bus participant device.

8. The bus participant device according to claim 1, characterized in that the slave unit is equipped with a double set of sending and receiving ports, where the function changer is switched in a third switching mode, in the event that serial data bus is operating without malfunctions, such that the sending port (Tm1) of the master unit that is active is connected to the first receiving port (Rs1) of the slave unit, and the receiving port (Rm1) of the active master unit is connected to the first sending port (Ts1) of the slave unit, and the second sending port (Ts2) of the slave unit is connected to the interface of the bus participant device, and the second receiving port (Rs2) of the slave unit is connected to the interface of the bus participant device.

9. The bus participant device according to claim 1, characterized in that the slave unit is equipped with a double set of sending and receiving ports, where, in a third switching mode, the slave unit and the master unit that is active can be switched to the data bus simultaneously for reading and writing and in series,
wherein the function changer is switched to a data bus formed as an open ring for the operation of the bus participant device, such that the sending port (Tm1) of the master unit that is local and active is connected to the first receiving port (Rs1) of the slave unit, and
the receiving port (Rm1) of the active master unit is connected to the interface of the bus participant device, and
the first sending port (Ts1) of the slave unit is connected to the interface of the bus participant device, and
the second sending port (Ts2) of the slave unit is connected to the interface of the bus participant device, and
the receiving port (Rs2) of the slave unit is connected to the interface of the bus participant device.

10. A method for operating a serial data bus operated according to a master-slave method, characterized in that a first bus participant device and a second bus participant device are connected to the data bus, and are each bus participant devices in accordance with claim 1,
wherein the first bus participant device contains a master unit which is active, and the second bus participant device comprises a master unit which is passive, and
wherein the method comprises the following process steps:
a1. the slave unit in the first bus participant device deactivates the master which is active in the first bus participant device as the result of monitoring the transmission of data telegrams on the data bus;
a2. the slave unit in the second bus participant device monitors the master which is active in the first bus participant device on the basis of data on the data bus, wherein the slave unit is activated in a read-only mode for reading traffic on the data bus and not writable, and wherein the master is configured to keep available data that an active bus master also has;
b1. in the event of a malfunction, the slave unit in the first bus participant device switches the master unit which is active in the first bus participant device to the first switching mode by means of its function changer, in consequence of which no further telegrams from the master unit reach the bus, and
b2. the slave unit in the second bus participant device effects the activation of the master unit comprised by the second bus participant device, depending on the results of the monitoring.

11. The method in accordance with claim 10, characterized in that the slave unit is configured to automatically recognize when it is to activate in consequence of the non-arrival of data telegrams or of unexpected receiving times.

12. The method in accordance with claim 10, characterized in that a slave unit in a bus participant device recognizes, through monitoring the transmission of the data telegrams via the data bus, that the master unit regularly transmits telegrams, and that the telegrams contain a high level of errors, and the slave unit deactivates the master unit of the first bus participant device in such a situation, in the event that a threshold level specified as a measure of malfunction frequency and/or quantity is exceeded.

13. The method in accordance with claim 10, characterized in that the bus participant device is switched between the following three switching modes by the function changer:
- in a first switching mode, the slave unit is switched to the data bus without a master unit,
- in a second switching mode, the slave unit is switched to the data bus with a master unit switched on only for reading, and
- in a third switching mode, the slave unit and the active master unit are switched in series to the data bus for reading and writing.

14. The method in accordance with claim 10, characterized in that, if an outcome of the monitoring determined by the master control unit means a status change of the master unit, the master control unit comprised by the slave unit directly informs the master unit of the status change required there, namely of a change of status from a previously passive status and mere listening to telegrams transmitted via the data bus, to an active status, assuming the function of a bus master, where the master control unit generates a switching signal to switch the function changer.

15. The method in accordance with claim 10, characterized in that the master control unit writes a predefined value in a master control register of its activation to activate the master unit, where the master control register is regularly monitored by the master unit.

16. The method in accordance with claim 10, characterized in that the data to be transmitted to a master unit which is passive and a master unit which is active is addressed to the local slave unit of the bus participant device by one or more process data objects (PDO) or service data objects (SDO),
- wherein the local slave unit evaluates the incoming process data objects (PDO) or service data objects (SDO) and forwards data contained therein, that are intended for the master unit,
- directly to an address area of a storage of the master unit, or
- reads from there and forwards the data to the data bus.

17. The method in accordance with claim 10, characterized in that the master unit is addressed by external bus participants as a subgroup of the slave unit, where the slave unit functions as a relay to the passive and active master unit.

18. The method in accordance with claim 10, characterized in that, to synchronize bus participants before, during or after a change of masters, time delays between the master unit which is newly active and the other participants are calculated and used by the master unit which is newly active to synchronize the bus participants.

* * * * *